United States Patent
Nguyen et al.

(10) Patent No.: US 7,228,356 B2
(45) Date of Patent: Jun. 5, 2007

(54) IGMP EXPEDITED LEAVE TRIGGERED BY MAC ADDRESS

(75) Inventors: Dat Ba Nguyen, Ottawa (CA); Bakri Aboukarr, Kanata (CA); Gregory Erich Gyetko, Dunrobin (CA)

(73) Assignee: Alcatel Canada Inc., Ottawa, Ontario (CA)

( * ) Notice: Subject to any disclaimer, the term of this patent is extended or adjusted under 35 U.S.C. 154(b) by 718 days.

(21) Appl. No.: 10/316,916

(22) Filed: Dec. 12, 2002

(65) Prior Publication Data
US 2004/0117503 A1    Jun. 17, 2004

(51) Int. Cl.
*G06F 13/00* (2006.01)
(52) U.S. Cl. .................. 709/231; 709/245; 725/120; 725/86
(58) Field of Classification Search ............... 709/230, 709/231, 227, 229, 245; 725/86, 106, 120
See application file for complete search history.

(56) References Cited

U.S. PATENT DOCUMENTS

| | | | |
|---|---|---|---|
| 6,208,647 B1 * | 3/2001 | Deng et al. ................. 370/390 |
| 6,563,830 B1 * | 5/2003 | Gershon et al. ........ 370/395.53 |
| 6,826,612 B1 * | 11/2004 | Bosloy et al. .............. 709/227 |
| 2004/0090970 A1 * | 5/2004 | Sanchez et al. ............ 370/397 |
| 2004/0111470 A1 * | 6/2004 | Poulsen et al. ............. 709/204 |
| 2004/0240466 A1 * | 12/2004 | Unitt et al. ................. 370/461 |

OTHER PUBLICATIONS

Cisco System; Catalyst 5000 Series Software Configuration Guide; Chapter 10; pp. 10-1 through 10-10; posted Jan. 18, 2003.*

* cited by examiner

*Primary Examiner*—Kenneth R. Coulter
(74) *Attorney, Agent, or Firm*—Jim Zegeer

(57) ABSTRACT

Method and apparatus for improving channel changing or channel surfing functionality in IGMP supported services.

7 Claims, 2 Drawing Sheets

IGMP EXPEDITED LEAVE TRIGGERED BY MAC ADDRESS

BACKGROUND AND BRIEF DESCRIPTION OF THE INVENTION

As data communication systems continue to evolve, the bandwidth capabilities of such communication systems continue to increase. As such, applications that require large amounts of bandwidth become increasingly feasible. One such application is the distribution of digital media services. Digital media services can provide video information such as television programs or movies, audio programs, and text based information streams.

Typically, the various types of digital media that may be provided are sourced from one or more information sources. These information sources are intended to provide the multimedia programming to a large number of users that have access to the information via one or more communication networks. Destination routers coupled to the communication network provide interfaces to end users, or subscribers.

Typically, multiple subscribers are coupled to a single communication link that is coupled to the router. This communication link is utilized for distribution of the program data streams, or channels, to the end users. The Internet Group Management Protocol (IGMP) has been developed by the Internet Engineering Task Force (IETF) as a standard that relates to the communication between the router and the subscriber, which is often referred to as a host. The communication between the router and the set of hosts coupled to a particular communication link is accomplished using point-to-multipoint multicast transmissions. IETF specifications RFC1112 "Host Extensions for IP Multicasting" and RFC2236 "Internet Group Management Protocol, Version 2" describe the use of the current IGMP standard in detail. (A table of acronyms as used herein can be found at the end of the specification.)

The IGMP protocol as currently defined by the IETF dictates how the multicast transmissions between the router and host are managed. Each of the hosts coupled to a router determines which of the potential multicast transmission groups, or channels, that it receives. When the communication link between the router and a plurality of hosts is shared by the plurality of hosts, bandwidth limitations on the communication link can require intelligent management of the multicast transmission provided via the communication link. For example, if a number of users reside on a single communication link and the bandwidth limitations only allow for a limited number of multicast transmissions to be supported over the communication link, usage of the particular multicast transmissions by the plurality of hosts must be monitored to ensure that bandwidth is not wasted on multicast transmissions which none of the hosts are actively receiving or using.

Thus, the invention relates to the problem of efficiently addressing channel changing operations performed by an end user system in which a Group Leave message for one multicast group is immediately followed by a Group Join message for another multicast group. It is important to perform this operation efficiently when the link from the end user systems to a network node providing connections to multicast channels is bandwidth limited, because the Group Join function cannot be completed until bandwidth is made available by processing the Group Leave request.

In conventional IGMP implementations, when a network node (e.g. ATM DSLAM) receives a Group Leave message for a multicast group, it immediately sends, to all end users systems connected to it, a Group Specific Query (GSQ) message pertaining to that group. The node then starts a timer, and if no reply to the GSQ message is received from any of the end users, the node processes the Leave request. That is, the node removes the connection to the channel that was being multicasted to the group, thereby making available bandwidth that was being used by the connection. In the case where an end user is changing channels and the link from the network node to the end user system is bandwidth limited, as previously described, the end user system will not be connected to the new channel until the timer expires. Although configurable, the timer is typically set to expire after 2 seconds; however, this is an unacceptable period time to wait for a channel changing operation to complete. A problem with this prior art solution of waiting until a timer expires (with no responses to the GSQ message received), before the executing the Leave and Join requests, is that it takes too long to complete a channel changing operation when the link is bandwidth limited.

U.S. application Ser. No. 09/469,034 filed Dec. 21, 1999 entitled "Method and Apparatus for an Improved Internet Group Management Protocol" (now U.S. Pat. No. 6,826,612)(owned by the assignee hereof and incorporated herein by reference) also addresses, inter alia, the problem of channel changing under bandwidth limited conditions. In this case, a host in a multicast group sends a Join message immediately after sending a Leave message and the time interval allowed for other hosts in the group to respond to a GSQ message sent responsive to the Leave request has not yet expired. The solution disclosed in the application is to first determine if there is enough bandwidth available to complete the Join operation. If there is not enough bandwidth, an Expedited Leave is performed in which one or more multicast groups pending termination are selected for immediately termination to provide enough bandwidth for the Join operation. There is a problem with this solution if Video on Demand (VoD) is also being provided from the same network node over the same link. In this case, the IGMP process running on the node will not be able to correctly determine the amount of bandwidth available for IP multicasting since it will not have information about the bandwidth used for the VoD service. Therefore, in this scenario, this solution would fail to identify the existence of a bandwidth limitation, and consequently it would not initiate an Expedited Leave action as it should. Instead, a standard Leave action would be initiated, which would result in an unnecessary delay (of approximately 2 seconds) in the execution of the end-user's channel changing request.

U.S. application Ser. No. 10/071,321, filed Feb. 8, 2002) entitled "Facilitating Multicast Group Switches Via a Single Internet Group management Protocol Message" (now abandoned) (owned by the assignee hereof and incorporated herein by reference) also addresses, inter alia, the problem of efficiently implementing the operation of channel changing. This patent application discloses a new IGMP switch message that combines the functionality of one or more pairs of Group Leave Join messages, thereby requiring less signalling bandwidth than separate messages would require. This combination of messages into a single message also reduces the amount of processing that may otherwise be required to perform the group switch. However, it also requires that systems be capable of interpreting the new switch message, which is not part of conventional IGMP implementations. Furthermore, the switch message does not eliminate the need to confirm that other end-user systems are not listening to a multicast group before its connection at a network node is removed. Therefore, the time taken to execute a channel change operation is not reduced by the switch message. This solution does not reduce the time required to complete a channel changing operation under bandwidth limited conditions on the link, as previously described, and therefore it does not provide acceptable channel changing functionality under such conditions. Also, the end-user systems must be able to interpret and respond to the new IGMP switch message, which could be problematic since this functionality is an enhancement to the standard IGMP protocol.

In view of the problems with the above-identified solutions an improved technique of providing channel changing functionality under bandwidth limited conditions is needed.

THE PRESENT INVENTION

The present invention solves the above-identified problem of managing IP multicast connections in a network by receiving, at a network node, the IGMP Group Join message from an end user device serviced by the network. At the network node, a comparison is made of the MAC address obtained from the Join message, of the end user device to another MAC address obtained from a pending Leave message for which there exists an internet protocol (IP) multicast connection to the network node. Then the network node determines whether or not any other end-user device (STB) is listening to the multicast group of the pending Leave message and then, upon determining whether any other end user device (STB) is listening to the multicast group in responsive to a Mate Match resulting from the comparison, initiating an Expedited Group Leave action for the end-user device on the IP multicast connection. Thus, the node determines whether any STB is listening to a particular multicast group by means of:

(a) keeping in memory a table of the MAC addresses of the listening STBs when Join messages are received for each multicast group;
  (b) Expedited Leave processing is triggered when a Join message is received;
  (c) to determine whether an Expedited Leave action can be performed on a pending Leave, its multicast group table is checked. If the multicast group table contains any MAC address(es) other than the one belonging to the pending Leave message then the Expedited Leave action cannot be performed. Otherwise, if the multicast group table contains only the MAC address which matches the MAC address of the pending Leave then the Expedited Leave action can be executed.

In addition, the invention features the step of sending a GSQ (Group Specific Query) message to all end-user devices serviced by the network node and further comprises reconnecting the end-user device responsive to the network node receiving an affirmative response of the GSQ message from the end-user device.

The invention provides faster execution of channel changing operations than in the prior art without requiring any modifications to an IGMP messaging. Moreover, the response to controls is important to achieve end-user satisfaction with any service. Therefore, improving the response to these controls such as the present invention does in the case of IGMP supported services, is important to service providers and vendors of equipment that provides these services. Finally, the invention is directed to improving channel-changing or channel-surfing functionality in IGMP supported services. This functionality would be frequently exercised by end users and therefore optimum performance is required for the user satisfaction.

The invention also applies to using the IP address of the STB instead of or a combination of both the MAC address and the IP address. The idea is to use some ID that identifies the STB.

BRIEF DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
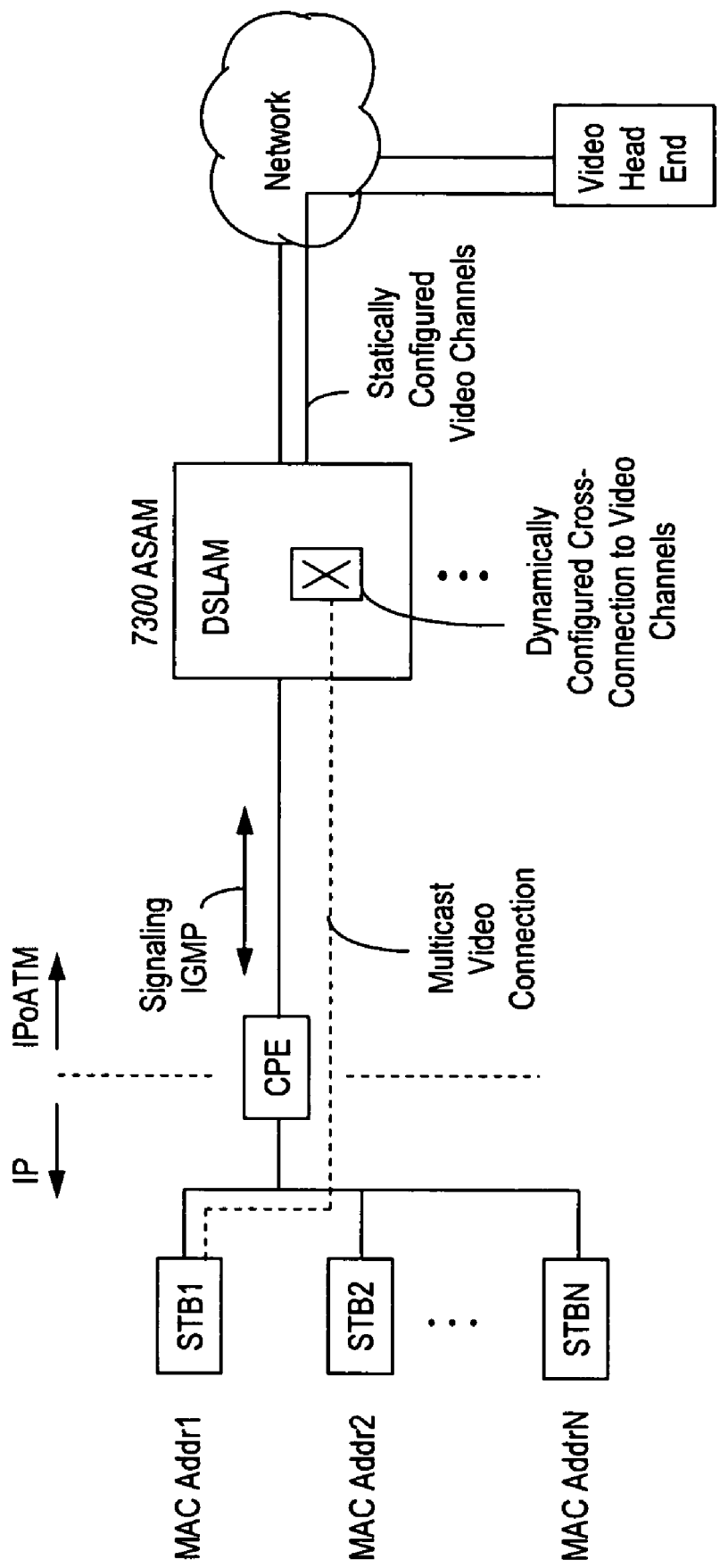
FIG. 1 shows a typical IGMP network architecture for multicasting video, or other high-speed services in an IP over the ATM (IPoATM) environment.

FIG. 1 shows a typical IGMP network architecture for multicasting video, or other high-speed services, in an IP over ATM (IPoATM) environment. Referring to FIG. 1, a video head end provides statically configured channels to a DSL access multiplexer (DSLAM) (Alcatel 7300 ASAM) via an ATM network. The video channels are dynamically cross-connected to customer premise equipment (CPE) units as IP multicast video connections over ATM. Each CPE unit performs IPoATM to IP interfacing to provide IP multicasted video channels to one or more set-top boxes (STB). Each STB sends IGMP messages to the DSLAM to effect certain actions, such as joining or leaving a multicast group.

Figure 2:
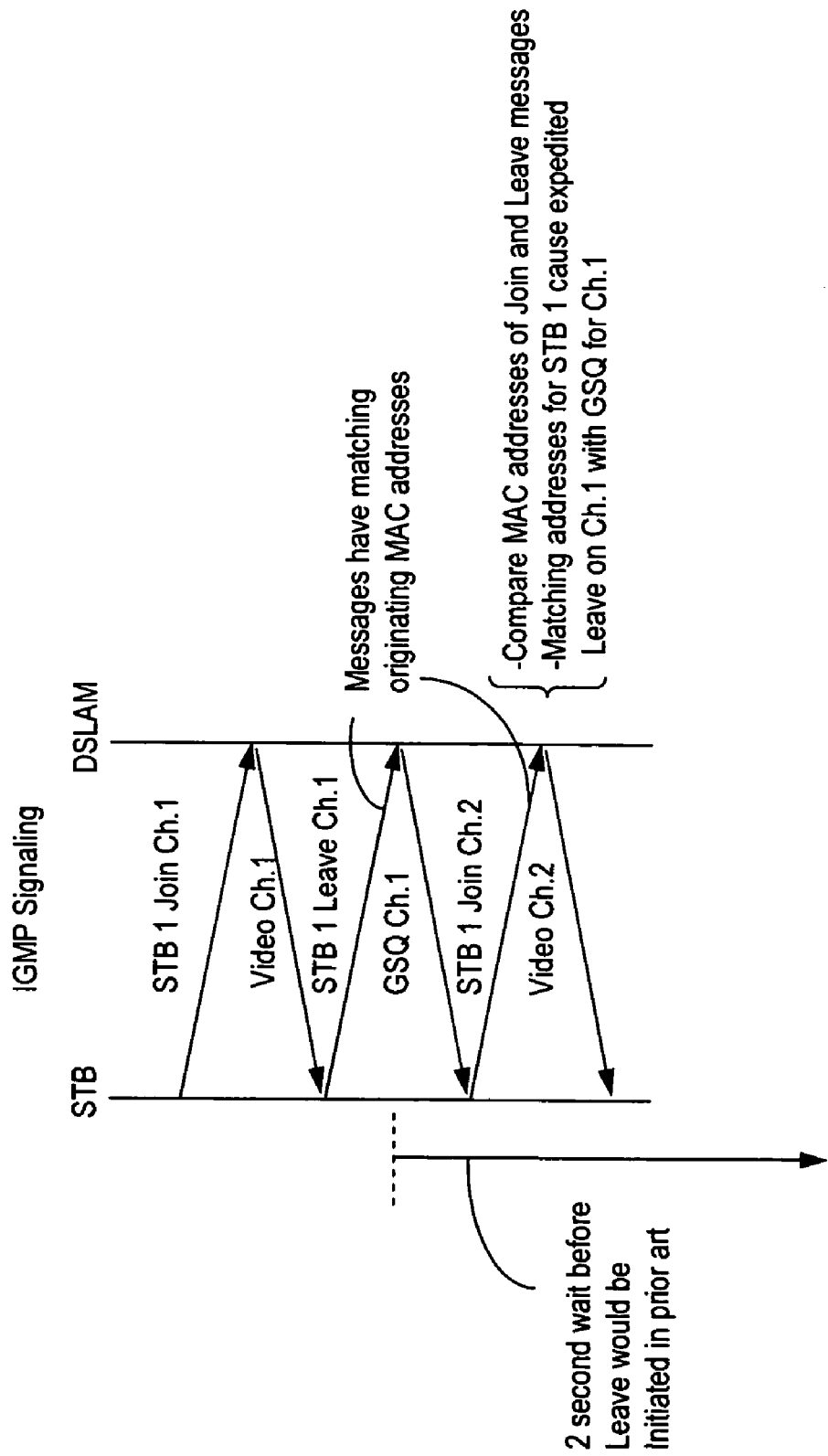
FIG. 2 is a diagrammatic representation of an IGMP messaging scenario held between a set-top box (STB) and a DSLAM.

FIG. 2 represents an IGMP messaging scenario between a STB and a DSLAM according to the invention. Referring to FIG. 2, the STB 1 sends the DSLAM a Group Join message requesting to join the multicast group for channel 1. A connection to channel 1 is established for STB 1 at the DSLAM and video on channel 1 is sent to STB 1. Then STB 1 sends a Group Leave message requesting a leave from the multicast group for channel 1. The DSLAM sends a GSQ for channel 1 and will execute the Leave channel 1 request if no other STBs services by the same CPE unit are listening to channel 1. The DSLAM will wait 2 seconds for a response to the GSQ before executing the Leave on channel 1. However, before this time period expires the STB 1 sends a Group Join message to the DSLAM requesting to join the multicast group for channel 2. In the case where the end-user at STB 1 is channel changing this Join request would almost immediately follow the previous Leave message, and end-user would expect a quick response (<2 seconds) to the channel change request.

According to the invention, whenever a DSLAM at a network node receives a Group Join message it compares the media access control (MAC) address of the originating STB to that of previous Leave messages for which there are existing connections, i.e. pending Leave requests. If a match is found and no other STB is listening to the multicast group that has the matching pending leave, then the DSLAM will initiate an Expedited Leave for the group of the matching pending Leave request. The DSLAM compares the MAC address of an end-user device (e.g. an STB) that originates a new IGMP Group Join message to that of Previous Leave messages still having existing connections, i.e. pending Leave requests. Upon detecting matching addresses, an Expedited Leave action is initiated to release the bandwidth of the unneeded connection, after which the new Join action is executed.

Summarizing, the node includes means to determine whether any STB is listening to a particular multicast group by:
(a) keeping in memory a table of the MAC addresses of the listening STBs when Join messages are received for each multicast group;
(b) triggering Expedited Leave processing when a Join message is received;
(c) with respect to a pending Leave, its multicast group table is checked to determine whether an Expedited Leave action can be performed. If the multicast group table contains any MAC address(es) other than the one belonging to the pending Leave message then the Expedited Leave action cannot be performed. Otherwise, if the multicast group table contains only the MAC address which matches the MAC address of the pending Leave then the Expedited Leave action can be executed.

ADVANTAGES OF THE INVENTION

The invention provides faster execution of channel changing operations than in prior art without requiring any modifications to IGMP messaging.

Response to controls is important to an end-user's satisfaction with any device. Therefore, improving the response to these controls, such as the present invention does in the case of IGMP supported services, is important to service providers and vendors of equipment that provides the services.

The invention is directed to improving channel changing, or channel surfing, functionality in IGMP supported services. This functionality would be frequently exercised by end-users and therefore optimum performance is required for user satisfaction.

ACRONYMS USED HEREIN

Asynchronous Transfer Mode (ATM)
Customer Premise Equipment (CPE)
Digital Subscriber Line Access Multiplexer (DSLAM)
Group Specific Query (GSQ)
Internet Group Management Protocol (IGMP)
Internet Engineering Task Force (IETF)
Internet Protocol (IP)
Internet Protocol over ATM environment (IPoATM)
Media Access Control (MAC)
Set-top Boxes (STB)
Video on Demand (VoD)

While the invention has been described in relation to preferred embodiments of the invention, it will be appreciated that other embodiments, adaptations and modifications of the invention will be apparent to those skilled in the art.

What is claimed is:

1. A method of managing IP multicast connections in a communications network having one or more network nodes connected to a plurality of end-user devices, comprising the steps of:
    (a) receiving, at a network node in the network, an IGMP Group Join message from an end-user device serviced by said network;
    (b) comparing, at said network node, a MAC address, obtained from the Join message, of said end-user device to another MAC address obtained from a pending Leave message for which there exists an IP multicast connection to said network node;
    (c) determining, at said network node, whether or not any other end-user device is listening to the multicast group of the pending Leave message; and
    (d) initiating, responsive to no other end-user device listening to the multicast group and responsive to a match resulting from the comparison in step (b), an Expedited Group Leave action for said end-user device on the IP multicast connection.

2. The method defined in claim 1 further characterized by the step of sending a GSQ message to all end-user devices serviced by the network node, and further comprises reconnecting the end-user device responsive to said network node receiving an affirmative response of the GSQ message from said end-user device.

3. In an IP multicast communications network employing IGMP signaling protocol and having video-on-demand head end coupled to one or more network nodes, a plurality of end-user devices, means in said network node for receiving a Group Join message from an end-user device serviced by said network, the improvement comprising: said network node having means for performing the following functions: comparing an MAC address extracted from said Group Join message with MAC addresses of pending Leave messages, determining whether or not any other end-user is listening to the multicast group of the pending Leave message, and in the absence of any other end-user device listening to the multicast group and responsive to a match resulting from said comparison, initiating an expedite a Group Leave action with the end-user device on the IP multicast connection.

4. The invention defined in claim 3 wherein said network node includes at least one DSLAM.

5. The invention defined in claim 3 wherein said end-user device includes a set-top box.

6. In an IP multicast communications network employing IGMP signaling protocol and having network node means, a plurality of end-user devices connected to said network node means, and means in said network node for receiving a Group Join message, which includes a MAC address, from an end-user device serviced by said network, the improvement comprising: said network node including means for performing the following functions: comparing MAC addresses extracted from said Join message, with the MAC addresses associated with pending Join and Leave messages, determining whether or not any other end-user is listening to the multicast group of the pending Leave message, and (a) in the absence of any other end-user device listening to the multicast group and (b) responsive to a match resulting from said comparison, initiating an expedited Group Leave action with the end-user device on the IP multicast connection.

7. In an IP multicast communications network employing IGMP signaling protocol and having a network node means, a plurality of end user devices connected to said network node means, a means in said network node for receiving a Group Join message, which includes a MAC address, from an end user device serviced by said network, the improvement in the method of managing IP multicast connections in said communication network characterized by:
    determining at said node whether any STB is listening to a particular multicast group by:
    keeping a memory table of the MAC addresses of the listening STBs when Join messages are received for each multicast group, and whenever a new Join message is received, determines whether bandwidth usage of the pending Leave(s) can be released by checking said memory table to determine whether an Expedited Leave action can be performed on a pending Leave according to the following:

(a) if the multicast group table contains any MAC address (es) other than the one belonging to the pending Leave message, then the Expedited Leave action cannot be performed, and (b) if the multicast group table contains only the MAC address which matches the MAC address of the pending Leave then the Expedited Leave action can be executed.

* * * * *